United States Patent
Itoh et al.

(10) Patent No.: US 7,736,733 B2
(45) Date of Patent: Jun. 15, 2010

(54) COATED CUTTING TOOL

(75) Inventors: Minoru Itoh, Itami (JP); Hideki Moriguchi, Itami (JP); Akira Sakamoto, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 875 days.

(21) Appl. No.: 10/598,193

(22) PCT Filed: Mar. 11, 2005

(86) PCT No.: PCT/JP2005/004295

§ 371 (c)(1),
(2), (4) Date: Aug. 21, 2006

(87) PCT Pub. No.: WO2005/087417

PCT Pub. Date: Sep. 22, 2005

(65) Prior Publication Data

US 2007/0154737 A1 Jul. 5, 2007

(30) Foreign Application Priority Data

Mar. 12, 2004 (JP) ............................. 2004-071745

(51) Int. Cl.
*B32B 9/00* (2006.01)
*B23B 27/14* (2006.01)

(52) U.S. Cl. ............................. 428/325; 51/307; 51/309; 407/117; 407/119; 428/216; 428/336; 428/698; 428/701; 428/702

(58) Field of Classification Search .................. 51/307, 51/309; 428/216, 325, 336, 472, 698, 701, 428/702; 407/117, 119
See application file for complete search history.

(56) References Cited

U.S. PATENT DOCUMENTS 4,643,620 A * 2/1987 Fujii et al. .................. 407/119

(Continued)

FOREIGN PATENT DOCUMENTS

JP 48-58470 A 8/1973

(Continued)

OTHER PUBLICATIONS

PCT International Preliminary Report on Patentability for PCT/JP2005/004295 issued on Sep. 19, 2006.

(Continued)

*Primary Examiner*—Archene Turner
(74) *Attorney, Agent, or Firm*—Ditthavong, Mori & Steiner, P.C.

(57) ABSTRACT

The present invention relates to a coated cutting tool wherein a ceramic film is formed on a cemented carbide substrate. The substrate is equipped with a ridge line of a cutting edge upon which round honing or combination honing has been performed, a breaker disposed on a rake face connected to the ridge line of the cutting edge, a base face, and an insert hole for securing to a holder. The nose radius is set to at least 1.6 mm. The ceramic film is equipped with an α-type aluminum oxide film. The ten-point average roughness Rz (5 microns reference length) is set to no more than 0.2 microns for the inside of the honed section, the flank face side of the honed section, and the rake face side of the honed section. The ten-point average roughness Rz is set to no more than 0.5 microns for the upper section of the breaker, the base face, and the area around the insert hole.

5 Claims, 1 Drawing Sheet

U.S. PATENT DOCUMENTS

| | | | |
|---|---|---|---|
| 5,597,272 A * | 1/1997 | Moriguchi et al. | 407/119 |
| 5,851,687 A * | 12/1998 | Ljungberg | 428/701 |
| 5,972,495 A * | 10/1999 | Ishii et al. | 428/325 |
| 6,187,421 B1 * | 2/2001 | Moriguchi et al. | 428/336 |
| 6,299,992 B1 * | 10/2001 | Lindskog et al. | 428/698 |
| 6,333,100 B1 * | 12/2001 | Palmqvist et al. | 428/216 |
| 6,612,786 B1 * | 9/2003 | Kanada et al. | 407/119 |
| 6,761,750 B2 * | 7/2004 | Zackrisson et al. | 75/241 |
| 7,135,221 B2 * | 11/2006 | Ruppi et al. | 428/702 |

FOREIGN PATENT DOCUMENTS

| | | | |
|---|---|---|---|
| JP | 48-37553 B | 11/1973 | |
| JP | 55-150941 A | 11/1980 | |
| JP | 59-219122 A | 12/1984 | |
| JP | 60-024371 A | 2/1985 | |
| JP | 5-9201 B2 | 2/1993 | |
| JP | 05-057507 A | 3/1993 | |
| JP | 7-73802 B2 | 8/1995 | |
| JP | 07-252579 A | 10/1995 | |
| JP | 8-18163 B2 | 2/1996 | |
| JP | 9-507528 A | 7/1997 | |
| JP | 10-156606 A | 6/1998 | |
| JP | 2825693 B2 | 11/1998 | |
| JP | 3006453 B2 | 2/2000 | |
| JP | 2000-141107 A | 5/2000 | |
| JP | 2000-218408 A | 8/2000 | |
| JP | 2003-94207 A | 4/2003 | |
| JP | 2003-094230 A | 4/2003 | |
| JP | 2003-175408 A | 6/2003 | |
| JP | 2004-50385 A | 2/2004 | |
| WO | WO 95/19457 | 7/1995 | |

OTHER PUBLICATIONS

Japanese Office Action for corresponding Patent Application No. JP 2004-071745, dated Sep. 17, 2009, pp. 1-6 Japan.

* cited by examiner

COATED CUTTING TOOL

CROSS-REFERENCE TO PRIOR APPLICATION

This is a U.S. national phase application under 35 U.S.C. §371 of International Patent Application No. PCT/JP2005/004295 filed Mar. 11, 2005, and claims the benefit of Japanese Application No. 2004-071745, filed Mar. 12, 2004. The International Application was published in Japanese on Sep. 22, 2005 as International Publication No. WO 2005/087417 A1 under PCT Article 21(2).

TECHNICAL FIELD

The present invention relates to a coated cutting tool suited for high-load cutting operations such as high-feed cutting and cutting with large depths of cut, and a cutting method using the same. More specifically, the present invention relates to a coated cutting tool and cutting method using the same that provides superior thermal crack resistance, making it possible to offer a long tool life and high-efficiency cutting.

BACKGROUND ART

Conventionally, cutting tools equipped with a coated film formed from ceramics formed on a cemented carbide substrate are well known. In cutting tools used for rough cutting of train wheels and the like, high-strength inserts are used. More specifically, inserts with large nose radii (corner radii), e.g., round inserts, that have undergone honing along the ridge line of the cutting edge are used. Because workpieces such as train wheels are large, variations in stock allowance tend to occur when performing cutting due to hardness variations from quenching and dimension variations from hot forging during production. Thus, there is a demand for inserts with adequate strength to allow stable cutting. Also, inserts with large nose radii make it possible to perform high-efficiency cutting since they result in thinner chips and faster feeding.

Coated cutting tools with surface treatment applied to the cutting edge to provide a stable tool life are also known. For example, Japanese Examined Patent Publication Sho 48-37553; Japanese Laid-Open Patent Publication Number Sho 48-58470; Japanese Laid-Open Patent Publication Number Sho 55-150941; and Japanese Laid-Open Patent Publication Number Sho 60-24371 describe structures in which a ceramic film is not formed on the ridge line of the cutting edge or in which ceramic film is removed from the ridge line of the cutting edge. Japanese Laid-Open Patent Publication Number Sho 59-219122 and Japanese Patent Publication Number 1805360 describe a coated cutting tool in which a ceramic film is thinner at the ridge line of the cutting edge. In Japanese Patent Publication Number 2138025 an aluminum oxide film formed from fine crystals coat the outermost layer. In Japanese Patent Publication Number 2105396 the surface of the ceramic film is smoothed. In Japanese Patent Publication Number 2825693 and Japanese Patent Publication Number 3006453, the ceramic film is formed with different types of film for the outermost layer of the ridge line of the cutting edge and the outermost layer of the other sections.

SUMMARY OF THE INVENTION

With conventional cutting tools, however, it is difficult to improve performance for the tool as a whole in high-load cutting operations such as the rough-cutting of large workpieces, e.g., train wheels. Thus, there is a need for a cutting tool with a longer tool life that allows stable cutting.

The rough-cutting of train wheels and the like described above is a high-load operation with a large depth of cut and high feed, e.g., a cut of approximately 3.5 mm and a feed rate of 2.0 mm. Thus, for these types of rough-cutting operations, cutting tools with large nose radii, e.g., high-strength round inserts, have been used conventionally. Also, cutting tools that have been processed with combination honing or round honing on the ridge line of the cutting edge have been used in order to prevent fracturing from these types of high-load cutting operations. The large nose radius and the honing performed on the ridge line of the cutting edge increases the principal force and the back force. This, combined with the wider nominal width of cut, results in increased cutting heat, tending to lead to thermal cracks. In many cases, fracturing resulting from these thermal cracks shortened tool life. Furthermore, since chips are larger due to the wider nominal width of cut, chip control becomes difficult, and these chips can lead to tool fracturing. Specifically, chips can impact the area around an insert hole used to secure the insert to the holder, leading to fracturing. Thus, there is a need for a cutting tool that can extend tool life and provide stable cutting while limiting tool fracturing, e.g., from the thermal cracking and chip contact described above, when performing high-load cutting operations such as the rough-cutting of train wheels.

The coated cutting tools described in Japanese Examined Patent Publication Sho 48-37553; Japanese Laid-Open Patent Publication Number Sho 48-58470; Japanese Laid-Open Patent Publication Number Sho 55-150941; Japanese Laid-Open Patent Publication Number Sho 60-24371; Japanese Laid-Open Patent Publication Number Sho 59-219122; and Japanese Patent Publication Number 1805360, the coating film is absent or thin at the ridge line of the cutting edge. This results in inadequate wear resistance when performing the high-load cutting operations described above. In the coated cutting tool described in Japanese Patent Publication Number 2138025, an aluminum oxide film is formed on the outermost layer of the coating film. Not only does this make identification of used sections (corners) difficult, but chip control is also made difficult when performing the high-load cutting operations described above due to thermal cracking resulting from the aluminum oxide crystals being too fine. In the coated cutting tool described in Japanese Patent Publication Number 3006453, oxide film, which has low heat conduction, is removed at the ridge line of the cutting edge, exposing the non-oxide film. This makes it difficult to prevent damage from thermal cracking. In the coated cutting tools described in Japanese Patent Publication Number 2105396 and Japanese Patent Publication Number 2825693, damage to the ridge line of the cutting edge can be prevented to a certain degree, but the structure does not take any measures against damage to the area around the insert hole or the breaker.

The object of the present invention is to provide a coated cutting tool with improved tool life that improves overall performance, especially under high-load cutting operations.

Another object of the present invention is to provide a cutting method using the coated cutting tool described above to perform efficient cutting operations.

In the present invention, the composition of the substrate and the quality and thickness of the ceramic film are optimized. In addition, sections that tend to be damaged are identified and surface treatment, more specifically, smoothing, is performed on these sections.

The present invention is a coated cutting tool with a ceramic film formed on a substrate and provides the following structure.

Substrate:

Composition

Hard phase: Formed from WC and at least one metal compound selected from the group consisting of a non-WC carbide, a nitride, and a carbonitride of a periodic table group 4a, 5a, 6a metal.

Proportion of the total volume of this metal compound relative to the volume of the WC: 1.5-20%.

Average WC grain size: 1-5 microns

Binder phase: Formed from at least one type of transition metal

Includes at least Co.

Proportion of volume of binder phase relative to the volume of the entire substrate: 7-20%

Shape

Formed with: a ridge line of a cutting edge with a honed section; a base face and a breaker disposed on a rake face connected to the ridge line of the cutting edge; and an insert hole for securing to a holder Honed section: round honing or combination honing is performed Nose radius: at least 1.6 mm Ceramic Film:

Film Type

Formed with an α-type aluminum oxide film, and at least one compound film selected from the group consisting of a carbide, a nitride, an oxide, a carbonitride, an oxycarbide, a carbon oxynitride, a boron nitride, and a boron carbon oxynitride of a periodic table group 4a, 5a, 6a metal and an aluminum oxide Film Thickness Thickness of α-type aluminum oxide film: 2-12 microns Thickness of entire ceramic film: 3-25 microns Composition Among the crystal grains forming the α-type aluminum oxide film, grains with a grain size of 3-5 microns are present on 5-80% of the surface area of the film Surface Treatment Surface roughness of an inside of the honed section, a flank face side of the honed section, and a rake face side of the honed section: no more than 0.2 microns for ten-point average roughness Rz (5 microns reference length)

Surface roughness of an upper section of the breaker, the base face, and an area around the insert hole: no more than 0.5 microns for a ten-point average surface roughness Rz (5 microns reference length)

In a cutting method according to the present invention, the coated cutting tool described above is used to cut a workpiece at a tool feed rate of at least 0.5 mm/rev.

The present invention will be described in further detail. First, a coated cutting tool according to the present invention will be described.

Substrate

A substrate in the present invention is formed from a cemented carbide that includes: a hard phase formed from WC and a metal compound as described above; and a binder phase formed from at least one type of transition metal. More specifically, in the present invention, the proportion of the total volume of the metal alloy relative to the WC volume is at least 1.5% and no more than 20%. If this proportion is less than 1.5%, the tool will not be able to handle high-load cutting and can lead to plastic deformation. If the proportion exceeds 20%, thermal cracking tends to occur. It is preferable for the proportion to be at least 3.0% and no more than 16.0%.

The average grain size of WC crystal grains is at least 1 micron and no more than 5 microns. If the average grain size is less than 1 micron, it becomes difficult to prevent thermal cracking from becoming pronounced. If the size exceeds 5 microns, the grains become too large. This can cause destruction of the WC itself and also tends to allow thermal cracking. It is preferable for the average grain size to be at least 1.5 microns and no more than 4.0 microns. The WC grain size can be controlled, e.g., by controlling the grain size of the raw powder or by controlling sintering temperature. The average WC grain size in the substrate can be determined by measuring the WC grain sizes in a predetermined region and calculating the average. Examples of methods for measuring WC grain size include image analysis and directly measuring lengths.

The binder phase includes at least Co. Thus, the phase can be formed solely from Co or by combining Co with another transition metal. The volume proportion of the binder phase relative to the entire substrate is at least 7% and no more than 20%. If the volume proportion is less than 7%, the tool cannot handle high-load cutting and tends to fracture. If the proportion exceeds 20%, there is too much binder phase, causing the substrate to become softer and leading to plastic deformation. It is more preferable for the volume proportion to be at least 9% and no more than 14%.

The substrate is equipped with a ridge line of the cutting edge, forming the blade, a rake face and a flank face connected to the ridge line. The ridge line of the cutting edge includes a honed section which has been honed to prevent fracturing caused by high-load cutting. More specifically, round honing or combination honing is performed. The rake face includes a breaker to break apart chips during cutting to make them smaller, and a base face connected to the breaker. The substrate is formed with an insert hole to secure the tool of the present invention to a holder. A large nose radius is used to allow efficient cutting under high loads. More specifically, the nose radius is set to be at least 1.6 mm. In particular, a round insert, which provides the largest nose radius, can be used.

Furthermore, it is preferable to provide a tough layer with a high degree of toughness on the surface of the substrate in order to efficiently prevent thermal cracks from progressing. More specifically, the surface can be formed with a region having an average Vickers hardness (500 g load) that is 0.3-1.5 GPa less than that of the inside of the substrate. It can be preferable for this tough layer to have a thickness along the depth axis of 2-50 microns. If the hardness difference is less than 0.3 GPa or the thickness is less than 2 microns, an adequate toughness cannot be obtained, making thermal cracks difficult to prevent. If the hardness difference exceeds 1.5 GPa or the thickness exceeds 50 microns, toughness is improved but the surface becomes too soft, leading to plastic deformation and reduced wear resistance due to reduced surface hardness. It is more preferable for the hardness difference to be at least 0.7 GPa and no more than 1.3 GPa and the thickness to be at least 10 microns and no more than 35 microns.

This tough layer can be formed using conventional methods such as adding a nitride to the raw powder ahead of time so that denitrification takes place during sintering. The average Vickers hardness can be adjusted, e.g., by controlling the granularity of the raw WC, the mixing time of the raw powder, the sintering temperature, or the sintering time. The thickness of the tough layer can be adjusted, e.g., by controlling the amount of nitrogen added to the substrate ahead of time. The thickness of the tough layer can be measured, e.g., by observing a cross-section of the area around the cutting edge using an optical microscope.

If combination honing, combining chamfer honing and round honing, is used as the honing method, it can be preferable for the tough layer to be formed on the areas outside the chamfered section, which forms the inside of the honed section. More specifically, it can be preferable for the tough layer to be formed on the flank face side of the honed section. It is preferable for a low-hardness region to be formed at the flank face side of the honed section to prevent thermal cracks from progressing. It is preferable for this low-hardness region to not be formed at the inside of the honed section (the chamfered section) to prevent plastic deformation. This type of localized tough layer at the ridge line of the cutting edge can be formed by first preparing a substrate with a tough layer formed over the entire substrate and then performing appropriate polishing or the like to remove the tough layer from unneeded sections.

Ceramic Film

In the present invention, a ceramic film is formed on the substrate. Specifically, the ceramic film includes an α-type aluminum oxide film and a film formed from a predetermined compound as described above. The α-type aluminum oxide film provides superior oxidation resistance in high temperatures and low heat conduction and limits thermal cracking. The α-type aluminum oxide has high strength and also tends not to react with iron, which is used often in workpieces, thus providing superior welding resistance by preventing welding and adhesion. Furthermore, α-type aluminum oxide prevents wear caused by welding, thus improving wear resistance as well. Thus, in the present invention, the ceramic film includes at least one layer of α-type aluminum oxide film.

The α-type aluminum oxide film has a thickness of 2-12 microns. If the thickness is less than 2 microns, providing adequate oxidation resistance properties and thermal resistance properties becomes difficult. If the thickness exceeds 12 microns, the strength of the film itself is reduced, leading to tool fractures. It would be more preferable for the thickness to be at least 2.5 microns and no more than 8.5 microns. If multiple layers of α-type aluminum oxide film are used, the ranges above are applied to the total film thickness.

In order to efficiently prevent thermal cracks from progressing, the crystal structure of the α-type aluminum oxide film contains coarse grains with relatively large grain sizes. More specifically, coarse particles with grain sizes of 3-5 microns are present over an area that is 5-80% of the surface area of the α-type aluminum oxide film. If the area proportion is less than 5%, the grains are too fine and cannot limit the progression of thermal cracks. If the proportion is greater than 80%, the strength of the film itself is reduced, leading to abnormal damage. The structures containing coarse grains in this manner can, for example, be formed by increasing the growth rate when growing the film or by increasing the amount of gas (e.g., $AlCl_3$, $H_2$, $CO_2$, $H_2S$) used when growing the film. The α-type aluminum oxide film can be formed using widely known film-forming conditions. If the α-type aluminum oxide film is the outermost layer, the area ratio can be determined, e.g., by taking multiple photographs randomly in regions with a predetermined area, determining the area of crystal grains having the corresponding grain sizes in each region, and dividing the total area for these crystal grains by the total area observed. The photographs can be taken, e.g., using an SEM. If the α-type aluminum oxide film is an inner layer, the area ratio can be determined by using the procedure described above after dissolving the films formed over this film using a strong acid solution or the like.

For the ceramic layer, it can be preferable for the α-type aluminum oxide film to be formed as an inner layer and for an outer layer to be formed from a titanium compound, i.e., at least one selected from the group consisting of a titanium carbide, a titanium nitride, and a titanium carbonitride. In particular, it is preferable for the outermost layer to be formed from a titanium nitride (TiN) to serve as a colored layer that allows easy identification of used sections. If the aluminum oxide film is used as the outermost layer, identification at the workplace of tool sections (corners) that have already been used becomes difficult.

If, in the ceramic film, an α-type aluminum oxide film forms an inner layer and a titanium compound film forms an outer layer, the outer layer (including the outermost layer) of the ceramic film covering the base face and the area on the upper surface from the ridge line of the cutting edge to the breaker can be at least partially removed to expose the inner α-type aluminum oxide film layer. This makes it possible to improve both corner identification and welding prevention at the same time. For example, the outer layer of the honed section, the upper section of the breaker, or the base face can be removed to expose the inner α-type aluminum oxide film layer, or the α-type aluminum oxide film can be exposed at the honed section and the upper surface of the breaker. More specifically, it is preferable for the proportion of the exposed α-type aluminum oxide film relative to the titanium nitride film formed as a colored layer to be 50%≦exposed α-type aluminum oxide film area/titanium nitride film area≦95%.

The ceramic film described above can be formed using a conventional CVD method. More specifically, thermal CVD could be used.

The total film thickness of the ceramic film is 3-25 microns. If the total film thickness is less than 3 microns, the film properties are not sufficiently effective. If the thickness exceeds 25 microns, the film becomes so thick that the strength of the film itself is reduced, leading to damage. It is more preferable for the entire film thickness to be at least 5 microns and no more than 15 microns.

Surface Treatment

In the present invention, predetermined sections of the tool have smooth surfaces. More specifically, the ten-point average roughness Rz (5 microns reference length) is set to no more than 0.2 microns for the inside of the honed section, the flank face side of the honed section, and the rake face side of the honed section. The ten-point average roughness Rz is set to no more than 0.5 microns for the upper section of the breaker, the base face, and the area around the insert hole. In the present invention, surfaces are smoothed in this manner to limit the destruction of the film at the film surface and to efficiently limit welding to the workpiece due to film destruction, thus extending tool life. If these surface roughness ranges are not met for these locations, the prevention of film destruction is inadequate.

In the tool of the present invention, surface treatment to smooth surfaces can be performed after the ceramic film is formed on the substrate. This smoothing operation can be performed through mechanical polishing or the like. More specifically, polishing using a brush and an abrasive such as diamond can be used.

With the coated cutting tool of the invention as described above, high-load cutting operations such as those involving large depths of cut and high feeds can be performed efficiently and stable processing can be performed over longer periods of time. More specifically, stable cutting can be performed for high-feed processing, e.g., at a tool feed rate of at least 0.5 mm/rev.

The present invention with the structure described above defines the nose radius in order to allow efficient high-load cutting, e.g., with large depths of cut and high feeds. In order to prevent fracturing, honing is performed at the ridge line of the cutting edge. In order to efficiently prevent problems associated with the structure, i.e., formation and progression of thermal cracks, smoothing is performed at predetermined locations. More specifically, by smoothing the rake face side such as the upper section of the breaker and the base face, the friction coefficient is reduced, thus preventing heat generation due to contact or impact with chips and preventing thermal cracking. Also, by smoothing the inside of the honed section, the flank face side, and the rake face side, the progression of thermal cracks can be prevented even if thermal cracks form. Furthermore, by smoothing the area around the insert hole, which is an aspect that conventional technologies have not addressed, it is possible to prevent sudden fracturing due to impact from chips.

In addition to the above aspects, the present invention is equipped with an α-type aluminum oxide film to provide superior strength and superior welding resistance. More specifically, in the present invention, coarse grains with relatively large crystal grain diameters are present so that chipping caused by thermal cracks can be limited. Also, the present invention is equipped with a ceramic film at the ridge line of the cutting edge so that adequate wear resistance can be provided even for high-load cutting operations. With these characteristics, the present invention can provide stable and efficient operations over long periods even when used in high-load cutting operations such as the rough cutting of train wheels.

DETAILED DESCRIPTION OF THE INVENTION

Figure 1:
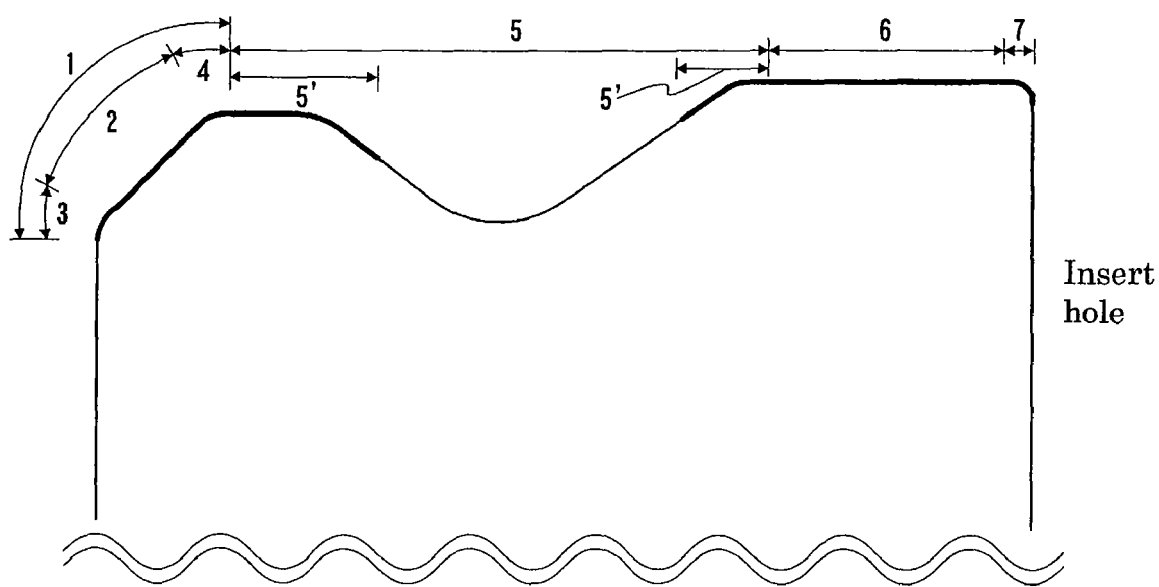
FIG. 1 is a simplified cross-section drawing of the cutting edge of a coated cemented carbide cutting tool according to the present invention.

The embodiments of the present invention are described below.

FIRST TEST EXAMPLE

As the raw powder for a substrate, predetermined amounts of WC, TaC, NbC, TiC, TiN, and Co powder were mixed according to the compositions shown in Table 1. After being wet-mixed for 15 hours using a ball mill and dried, the powders were pressed to form green compacts having a predetermined shape. In this example, the powder were shaped according to the round insert with insert breaker RCMX320900V (nose radius: 16 mm). The green compacts were inserted in a sintering furnace and sintered for 0.5-3.5 hours at a temperature of 1650-1800 K in a mixed gas atmosphere of nitrogen, hydrogen, carbon monoxide, and argon or in a vacuum atmosphere. This results in sintered structures formed with a tough layer resulting from denitrification of hard phase grains of the substrate surface (deposition of a β-free layer takes place). These sintered structures were examined, and it was found that, for all of the substrates, the average Vickers hardness (500 g load) of the substrate surfaces was 0.3-1.5 GPa lower than that of the inside of the substrate. Also, the thicknesses of the tough layers were varied by controlling the nitride content in the mixtures. Table 1 shows substrate composition, proportion relative to the WC volume of the non-WC metal compounds forming the hard phase (in these examples, TaC, NbC, TiC, and TiN) ("A" in Table 1), the average WC grain size ("B" in Table 1), the volume proportion of Co relative to the volume of the entire substrate ("C" in Table 1), and the thickness along the depth axis of the tough layer ("D" in Table 1).

The average WC grain size and the thickness along the depth axis of the tough layer were measured by applying a specular finish to a cross-section of the substrate, corroding the cross-section with Murakami's reagent, and then observing the cross-section with an optical microscope.

TABLE 1

| Substrate | Composition of substrate (% by mass) | | | | | | A (%) | B µm | C (%) | D µm |
|---|---|---|---|---|---|---|---|---|---|---|
| | WC | TiC | TiN | TaC | NbC | Co | | | | |
| a | 85.9 | 1.5 | 1.0 | 2.4 | 1.2 | 8.0 | 12.5 | 2.5 | 12.5 | 19.4 |
| b | 85.9 | 1.5 | 1.0 | 2.4 | 1.2 | 8.0 | 12.5 | 0.8 | 12.5 | 21.5 |
| c | 85.9 | 1.5 | 1.0 | 2.4 | 1.2 | 8.0 | 12.5 | 1.3 | 12.5 | 20.6 |
| d | 85.9 | 1.5 | 1.0 | 2.4 | 1.2 | 8.0 | 12.5 | 4.7 | 12.5 | 12.7 |
| e | 85.9 | 1.5 | 1.0 | 2.4 | 1.2 | 8.0 | 12.5 | 5.5 | 12.5 | 12.5 |
| f | 91.4 | 0.0 | 0.3 | 0.2 | 0.1 | 8.0 | 1.4 | 2.5 | 13.1 | 2.2 |
| g | 90.8 | 0.0 | 0.3 | 0.6 | 0.3 | 8.0 | 2.2 | 2.5 | 13.1 | 3.5 |
| h | 81.4 | 1.8 | 1.0 | 5.2 | 2.6 | 8.0 | 19.0 | 2.5 | 12.2 | 25.6 |
| i | 77.8 | 1.8 | 1.0 | 7.6 | 3.8 | 8.0 | 23.5 | 2.5 | 12.1 | 27.8 |
| j | 89.6 | 1.5 | 1.0 | 2.4 | 1.2 | 4.3 | 12.2 | 2.5 | 6.9 | 13.4 |
| k | 88.9 | 1.5 | 1.0 | 2.4 | 1.2 | 5.0 | 12.3 | 2.5 | 8.0 | 15.1 |
| l | 87.9 | 1.5 | 1.0 | 2.4 | 1.2 | 6.0 | 12.4 | 2.5 | 9.5 | 16.7 |
| m | 82.9 | 1.5 | 1.0 | 2.4 | 1.2 | 11.0 | 13.1 | 2.5 | 16.8 | 19.4 |
| n | 80.9 | 1.5 | 1.0 | 2.4 | 1.2 | 13.0 | 13.4 | 2.5 | 19.6 | 19.4 |
| o | 79.9 | 1.5 | 1.0 | 2.4 | 1.2 | 14.0 | 13.5 | 2.5 | 21.0 | 19.4 |
| p | 86.9 | 1.4 | 0.1 | 2.4 | 1.2 | 8.0 | 9.9 | 2.5 | 12.7 | 1.6 |
| q | 85.9 | 2.1 | 0.4 | 2.4 | 1.2 | 8.0 | 12.8 | 2.5 | 12.5 | 5.5 |
| r | 85.9 | 0.5 | 2.0 | 2.4 | 1.2 | 8.0 | 12.5 | 2.5 | 12.4 | 43.6 |
| s | 85.9 | 0.0 | 2.5 | 2.4 | 1.2 | 8.0 | 12.3 | 2.5 | 12.5 | 55.8 |

For each of the substrates formed with tough layers, combination honing was performed using diamond grindstone and ceramic abrasive to form a honed section at the ridge line of the cutting edge. In these examples, the sizes of the combination honing were all identical. Chamfer honing at 0.2 mm×−25° and round honing at R 0.02 mm were performed. As a result of this combination honing operation, the tough layer is completely removed from the chamfered section inside the honed section so that the tough layer remains only on the flank face side and the rake face side of the honed section. In the test sample T shown in Table 2, chamfer honing was performed when the structure was a green compact. Thus, the tough layer remained on the chamfered section after sintering.

Thermal CVD was performed under predetermined temperature, gas, and pressure conditions on the honed substrates, resulting in the multi-layer ceramic film coatings shown in Table 2. Table 2 shows the compositions and thicknesses of the ceramic films. In Table 2, thickness is indicated by the number in parentheses after the chemical formula for the film composition.

U-Y, the growth rates used for forming the films were adjusted to change the granular variation of the aluminum oxide.

A brush with diamond abrasive was used to mechanically polish the ceramic-coated test samples. FIG. 1 shows a simplified cross-section drawing of a section of a coated cutting tool produced in this example. In this example, the inside of a honed section 1 (a chamfered section 2), a flank face side 3 of the honed section 1, and a rake face side 4 of the honed section 1 are polished to a predetermined surface roughness, starting from the rake face side. Table 3 shows surface roughnesses Rz (ten-point average roughness, 5 micron reference length) for the different locations (in Table 3, "F" is the surface roughness Rz of the chamfered section, "G" is the surface roughness Rz of the flank face side, and "H" is the surface roughness Rz of the rake face side). In addition to the above locations, polishing is performed in a similar manner on an upper section 5' of a breaker 5, a base face 6, and an insert hole area 7. For these locations (the upper section 5', the base face 6, and the area around the insert hole 7), the surface roughness Rz (ten-point average roughness, 5 micron reference length)

TABLE 2

| Sample | Substrate | Film type and thickness (microns) | | | | | | E % |
|---|---|---|---|---|---|---|---|---|
| | | Layer 1 | Layer 2 | Layer 3 | Layer 4 | Layer 5 | Layer 6 | |
| A | a | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| B | b | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| C | c | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| D | d | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| E | e | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| F | f | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| G | g | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| H | h | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| I | i | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| J | j | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| K | k | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| L | l | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| M | m | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| N | n | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| O | o | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| P | p | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| Q | q | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| R | r | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| S | s | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| T | a* | Ti(CN)(7.3) | Ti(BCN)(0.3) | Ti(BCNO)(0.2) | $\alpha$-Al$_2$O$_3$(3.5) | Ti(NO)(0.4) | TiN(0.7) | 30 |
| U | a | Ti(CN)(7.3) | Ti(BCN)(0.3) | Ti(BCNO)(0.2) | $\alpha$-Al$_2$O$_3$(1.5) | Ti(NO)(0.4) | TiN(0.7) | 3 |
| V | a | Ti(CN)(4.2) | Ti(BCN)(0.3) | Ti(BCNO)(0.2) | $\alpha$-Al$_2$O$_3$(7.7) | Ti(NO)(0.4) | TiN(0.7) | 60 |
| W | a | Ti(CN)(2.8) | Ti(BCN)(0.3) | Ti(BCNO)(0.2) | $\alpha$-Al$_2$O$_3$(12.8) | Ti(NO)(0.4) | TiN(0.7) | 75 |
| X | a | Ti(CN)(5.5) | Ti(BCN)(0.3) | Ti(BCNO)(0.2) | $\alpha$-Al$_2$O$_3$(2.2) | Ti(NO)(0.4) | TiN(0.7) | 3 |
| Y | a | Ti(CN)(3.4) | Ti(BCN)(0.3) | Ti(BCNO)(0.2) | $\alpha$-Al$_2$O$_3$(8.7) | Ti(NO)(0.4) | TiN(0.7) | 95 |
| Z | a | Ti(CN)(7.2) | Ti(CNO)(0.5) | $\kappa$-Al$_2$O$_3$(3.5) | Ti(CN)(0.5) | TiN(0.7) | — | 3 |

Also, the area ratio (%) of crystal grains having grain sizes of 3-5 microns among the crystal grains on the surface of the aluminum oxide film was determined. These results are also shown in Table 2 ("E" in Table 2). The area ratios were determined as follows. First, Ti-based compound films (the fifth and sixth layers in Table 2) on the aluminum oxide film were dissolved using a strong acid solution (containing hydrofluoric acid) to expose the aluminum oxide film to the surface. Next, five random 200 micron$^2$ regions on the exposed aluminum oxide film were observed and photographed using an SEM (8000×) to measure the grain size of the crystal grains. Then, for each of these regions, the area of crystal grains with a grain size of 3-5 microns was determined and this was divided by the total observed area (the total area of the 5 regions) to calculate the area ratio. In test samples was set to be no more than 0.5 microns. In this example, surface roughnesses were determined by observing, at 5000-50,000×, cross-sections of mechanically polished tools after ceramic film coating as described above was applied. This applies to the second test example described below. In FIG. 1, the sections indicated by thick lines are the sections on which mechanical polishing is performed.

Using the tools obtained by forming films and applying surface treatment as described above, wet continuous cutting tests were performed under the conditions described below, and the number of thermal cracks, the amount of $V_B$ wear (flank wear), and the presence of chipping were measured. For tools that could no longer cut in less than 20 minutes cutting time, measurements were made for the number of thermal cracks, $V_B$ wear, and presence of chipping at the time cutting was stopped. $V_B$ wear is not indicated for tools for which $V_B$ wear could not be measured due to fracturing or breakage. These points apply to the second test example described later as well. Table 3 shows test results.

Cutting Test Conditions
Workpiece: JIS/SCM435 rod
Cutting speed: 150 m/min
Feed: 2.0 mm/rev.
Cutting depth: 3.5 mm
Cutting time: 20 minutes maximum

* These cutting test conditions roughly correspond to conditions for rough-cutting of train wheels.

TABLE 3

| Tool No. | Sample used | F μm | G μm | H μm | Cutting time (min) | Thermal crack count | Chipping | $V_B$ wear (mm) |
|---|---|---|---|---|---|---|---|---|
| 1 | A | 0.15 | 0.16 | 0.11 | 20 | 4 | None | 0.167 |
| 2 | C | 0.13 | 0.08 | 0.05 | 20 | 3 | None | 0.154 |
| 3 | D | 0.17 | 0.11 | 0.13 | 20 | 4 | None | 0.186 |
| 4 | G | 0.15 | 0.11 | 0.12 | 20 | 1 | None | 0.196 |
| 5 | H | 0.15 | 0.10 | 0.15 | 20 | 7 | None | 0.139 |
| 6 | K | 0.16 | 0.16 | 0.16 | 20 | 4 | None | 0.155 |
| 7 | L | 0.11 | 0.09 | 0.12 | 20 | 4 | None | 0.146 |
| 8 | M | 0.17 | 0.16 | 0.11 | 20 | 3 | None | 0.212 |
| 9 | N | 0.16 | 0.15 | 0.16 | 20 | 4 | None | 0.22 |
| 10 | P | 0.11 | 0.07 | 0.13 | 20 | 4 | Yes | 0.157 |
| 11 | Q | 0.16 | 0.16 | 0.2 | 20 | 3 | None | 0.16 |
| 12 | R | 0.10 | 0.11 | 0.11 | 20 | 3 | None | 0.178 |
| 13 | S | 0.12 | 0.09 | 0.15 | 20 | 3 | None | 0.235 |
| 14 | T | 0.15 | 0.13 | 0.13 | 20 | 4 | None | 0.233 |
| 15 | V | 0.19 | 0.20 | 0.19 | 20 | 5 | None | 0.205 |
| 21 | B | 0.07 | 0.06 | 0.08 | 5 | 0 | Fracture | |
| 22 | E | 0.19 | 0.17 | 0.16 | 15 | 5 | Yes | 0.465 |
| 23 | F | 0.14 | 0.14 | 0.14 | 17 | 1 | None | 0.423 |
| 24 | I | 0.15 | 0.13 | 0.14 | 19 | 9 | Fracture | |
| 25 | J | 0.13 | 0.12 | 0.12 | 3 | 1 | Fracture | |
| 26 | O | 0.13 | 0.11 | 0.1 | 18 | 4 | None | 0.491 |
| 27 | U | 0.18 | 0.18 | 0.15 | 13 | 4 | Yes | 0.214 |
| 28 | W | 0.11 | 0.08 | 0.12 | 6 | — | Destroyed | |
| 29 | X | 0.18 | 0.15 | 0.15 | 15 | 6 | Yes | 0.236 |
| 30 | Y | 0.05 | 0.05 | 0.05 | 10 | 4 | Yes | 0.225 |
| 31 | Z | 0.11 | 0.08 | 0.12 | 8 | 5 | Yes | 0.346 |
| 32 | A | 1.51 | 1.65 | 1.33 | 5 | — | Destroyed | |

As Table 3 shows, the tools No. 1-15 experienced normal damage even with high-load cutting operations, e.g., high feed, large depth of cut. More specifically, while thermal cracks formed, they did not grow. Thus, there was no fracturing from thermal cracks, and these tools were able to cut for 20 minutes. $V_B$ wear was also appropriate, at 0.139-0.235 mm, for the tools No. 1-15. Furthermore, none of the tools No. 1-15 showed fracturing to the upper section of the breaker, the base face, or around the insert hole.

Although the tool No. 10 was able to cut for 20 minutes, it had a thinner tough layer, making it less tough than the other tools, with more chipping. Conversely, the tool No. 13, which had a thick tough layer, was less hard than the other samples and showed more $V_B$ wear. Because of the tough layer formed on the chamfered section, the tool No. 14 tended to show more plastic deformation compared to the other tools.

The tools No. 21-32, on the other hand, all showed fracturing from thermal cracking, chipping, and large $V_B$ wear, with some even breaking. More specifically, due to small average WC grain size, the tool No. 21 experienced rapid thermal cracking and was fractured in an extremely short period of time. Conversely, the tool No. 22 had a large average WC grain size so that WC grains came loose around the surfaces of thermal cracks, making it impossible for the tool to cut after 15 minutes. The tool No. 23, which had less non-WC compounds in the hard phase, underwent plastic deformation and large $V_B$ wear and was unable to cut after 17 minutes. The tool No. 24, which had more non-WC compounds, experienced significant thermal cracking and was unable to cut after 19 minutes due to fracturing from thermal cracking. The tool No. 25, which had less binder phase, was fractured in 3 minutes due to inadequate strength. The tool No. 26, which had more binder phase, underwent plastic deformation and was unable to cut due to large $V_B$ wear.

The tool No. 27, which had a thin aluminum oxide film, and the tool No. 29, which had an aluminum oxide film formed from fine crystal grains, showed appropriate thermal crack counts and $V_B$ wear, but the progression of thermal cracking caused the film around the thermal crack surfaces to come off, making cutting impossible. The tool No. 28, which had a thick aluminum oxide film, had inadequate strength and broke. In the tool No. 30, the film around thermal crack surfaces came off because the aluminum oxide crystal grains were too large, making it impossible to continue cutting. The tool No. 31, which had a K-type aluminum oxide film that is unstable at high temperatures, showed abnormal damage, in which the film was destroyed and peeled off early in the cutting operation. The tool No. 32, for which smoothing was not performed on the honed sections, broke due to high friction coefficient and cutting force.

The above test results confirmed that the coated cutting tool of the present invention can prevent fracturing from thermal cracks and provide stable cutting over long periods even for high-load cutting operations, e.g., with deep cuts and high feed rates.

SECOND TEST EXAMPLE

Multiple chips having structures similar to that of the test sample A from the first test example were prepared. After forming the ceramic film, each of these chips was mechanically polished using a brush with diamond abrasive as in the first test example. In this test, the tools were processed so that the surface roughness Rz (ten-point average roughness; 5 microns reference length) of the inside of the honed section, the flank face side of the honed section, and the rake face side of the honed section was no more than 0.2 microns. Then, similar polishing was performed on the upper section of the breaker, the base face, and around the insert hole to vary the surface roughnesses at the different locations. Table 4 shows surface roughnesses Rz of the different locations. In Table 4, "I" is the surface roughness Rz of the upper section of the breaker, "J" is the surface roughness Rz of the base face, and "K" is the surface roughness around the insert hole.

The tools that have been surface treated as described above underwent a wet continuous cutting test under the same conditions as in the first test example, and thermal crack counts, $V_B$ wear, and presence of chipping were recorded. The results are shown in Table 4 as well.

TABLE 4

| Tool No. | Sample used | I μm | J μm | K μm | Cutting time (min) | Thermal crack count | Chipping | $V_B$ wear (mm) |
|---|---|---|---|---|---|---|---|---|
| 16 | A | 0.46 | 0.45 | 0.43 | 20 | 4 | None | 0.177 |
| 33 | A | 0.48 | 1.35 | 1.45 | 2 | — | Destroyed | |
| 34 | A | 1.44 | 0.39 | 1.56 | 2 | — | Destroyed | |
| 35 | A | 1.42 | 1.39 | 0.39 | 5 | — | Destroyed | |

TABLE 4-continued

| Tool No. | Sample used | I μm | J μm | K μm | Cutting time (min) | Thermal crack count | Chipping | $V_B$ wear (mm) |
|---|---|---|---|---|---|---|---|---|
| 36 | A | 1.5 | 1.75 | 1.34 | 1 | — | Destroyed | |

As shown in Table 4, the tool No. 16, in which the upper section of the breaker, the base face, and the area around the insert hole were smoothed, experienced normal damage even with high-load cutting operations, e.g., high feed rates and deep cuts, and could be used to cut for 20 minutes. In contrast, the tools No. 33 through 36, where the surface of at least one of the upper section of the breaker, the base face, or the area around the insert hole was rough, all broke. With the tools No. 33 and 34, chips impacted the area around the cutting hole, leading to breakage. With the tool No. 35, chip control was unstable so that there was entanglement of chip, leading to breakage. The tool No. 36 broke immediately after the test was begun. These test results confirmed that, for high-load cutting operations such as those described above, it would be preferable to smooth not only the ridge line of the cutting edge but also the upper section of the breaker, the base face, and the area around the insert hole.

THIRD TEST EXAMPLE

Multiple chips having structures similar to that of the test sample A from the first test example were prepared. The ceramic film coating on the honed section, the upper surface of the breaker, and the base face was mechanically polished using a brush with diamond abrasive as in the first test example. The Ti(NO) film of the fifth layer and the TiN film of the sixth (outermost) layer were removed to expose the α-type aluminum oxide film of the fourth layer. In this test, all the tools were processed so that the surface roughness Rz (ten-point average roughness, 5 micron reference length) of the inside of the honed section, the flank face side of the honed section, and the rake face side of the honed section was no more than 0.2 microns and the surface roughness Rz (ten-point average roughness, 5 micron reference length) of the upper section of the breaker, the base face, and the area around the insert hole was no more than 0.5 microns.

Each of the tools surface-treated in this manner underwent a wet continuous cutting test under the same conditions as the first test example described above, and the thermal crack count, $V_B$ wear, and presence of chipping were recorded. The results are shown in Table 5.

As Table 5 shows, exposing the inner-layer α-type aluminum oxide film from the honed section, the upper section of the breaker, or the base face prevented the tool from welding to the workpiece, thus improving wear resistance and making the cutting operation more stable.

The cutting tool of the present invention is suited for high-load cutting operations, e.g., with deep cuts or high feed rates. More specifically, the present invention is suited for rough-cutting, e.g., of train wheels.

The invention claimed is:

1. A round cutting insert for train wheels with a ceramic film formed on a substrate wherein:
   said substrate is formed from a hard phase and a binder phase, said hard phase being formed from WC and at least one metal compound selected from the group consisting of: a non-WC carbide, a nitride, and a carbonitride of a periodic table group 4a, 5a, 6a metal; and
   said binder phase being formed from at least one type of transition metal;
   in said hard phase, a total volume of said metal compound has a proportion of 1.5-20% relative to a volume of said WC, and an average grain size of said WC is 1-5 microns;
   said binder phase contains at least Co and a volume of said binder phase relative to a total volume of said substrate is 7-20%;
   said substrate includes a ridge line of a cutting edge with a honed section, a base face and a breaker disposed on a rake face connected to said ridge line of said cutting edge, and an insert hole for securing to a holder;
   round honing or combination honing is performed on said honed section and a nose radius is at least 1.6 mm;
   said ceramic film includes an a-type aluminum oxide film, and at least one compound film selected from the group consisting of: a carbide, a nitride, an oxide, a carbonitride, an oxycarbide, a carbon oxynitride, a boron nitride, and a boron carbon oxynitride of a periodic table group 4a, 5a, 6a metal and an aluminum oxide;
   said a-type aluminum oxide film has a thickness of 2-12 microns;
   grains with grain sizes of 3-5 microns are present over 5-80% of the area of the a-type aluminum oxide film surface;
   the over-all thickness of the ceramic film is 3-25 microns;
   a ten-point average surface roughness Rz (5 microns reference length) of an inside of said honed section, a flank face side of said honed section, and a rake face side of said honed section is no more than 0.2 microns; and

TABLE 5

| Tool No. | Sample Used | Honed section | Outermost Layer Upper section of breaker | Outermost Layer Base Face | Cutting Time (minutes) | Thermal Crack Count | Chipping | $V_B$ Wear (mm) |
|---|---|---|---|---|---|---|---|---|
| 17 | A | α-Al$_2$O$_3$ exposed | TiN | TiN | 20 | 2 | NONE | 0.165 |
| 18 | A | TiN | α-Al$_2$O$_3$ exposed | TiN | 20 | 3 | NONE | 0.158 |
| 19 | A | TiN | TiN | α-Al$_2$O$_3$ exposed | 20 | 3 | NONE | 0.162 |
| 20 | A | TiN | TiN | TiN | 20 | 4 | NONE | 0.179 | a ten-point average surface roughness Rz (5 microns reference length) at an upper section of said breaker, said base face, and an area around said insert hole is no more than 0.5 microns.

2. A round cutting insert for train wheels according to claim 1 further comprising:

an outer layer of said ceramic film is formed from a titanium compound, with an outermost layer being formed from a titanium nitride;

said outer layer is at least partially removed from said ceramic film coating applied from said ridge line of a cutting edge to said base face and said upper surface of said breaker; and said α-type aluminum oxide film is exposed from said section from which said outer layer is removed.

3. A round cutting insert for train wheels according to claim 1 wherein:

a surface of said substrate is formed with a tough layer with an average Vickers hardness (500 g load) that is less than an inside of said substrate by 0.3-1.5 GPa; and said tough layer has a thickness along a depth axis of 2-50 microns.

4. A round cutting insert for train wheels as in claim 3 wherein:

combination honing is performed on said honed section; and said tough layer is not formed on said inside of said honed section, and said tough layer is formed on said flank face side of said honed section.

5. A method for cutting wherein a workpiece is cut at a tool feed rate of at least 0.5 mm/rev. using a round cutting insert for train wheels as described in claim 1.

* * * * *